United States Patent [19]
Glifberg

[11] 4,064,681
[45] Dec. 27, 1977

[54] MACHINE FOR REMOVING FOLIAGE FROM ROOT CROPS

[75] Inventor: Nils Bertil Glifberg, Staffanstorp, Sweden

[73] Assignee: Svenska Sockerfabriks AB, Malmo, Sweden

[21] Appl. No.: 609,122

[22] Filed: Aug. 29, 1975

[51] Int. Cl.² .................................... A01D 23/02
[52] U.S. Cl. ........................................... 56/121.45
[58] Field of Search .................. 56/121.4–121.46; 37/43 B

[56] References Cited

U.S. PATENT DOCUMENTS

| 1,127,829 | 2/1915 | Tough | 56/121.45 |
| 1,222,099 | 4/1917 | Hancock | 56/121.45 |
| 1,301,328 | 4/1919 | Smith | 56/121.45 X |
| 1,346,322 | 7/1920 | Lewis et al. | 56/121.45 X |
| 2,743,538 | 5/1956 | Linzy | 37/43 B |

FOREIGN PATENT DOCUMENTS

| 1,095,510 | 12/1967 | United Kingdom | 56/121.45 |
| 336,701 | 7/1971 | Sweden | 56/13.4 |

Primary Examiner—Russell R. Kinsey
Attorney, Agent, or Firm—Beveridge, DeGrandi, Kline & Lunsford

[57] ABSTRACT

A machine for the removal of foliage from root crops, especially sugar beets. The machine has a frame with a shaft which is rotatable in the longitudinal direction of the machine and carries at its forward end a stripping wheel rotatably mounted in a forwardly open casing and having wings of propeller blade-like pitch, for removing the foliage and carrying it away by means of an air stream generated by the wings. Attached to the machine frame behind the casing, is a vertically adjustable knife for severing the crown of the root crop, and immediately behind the knife there is attached to the rearward end of the shaft a cleaning and conveying wheel for cleaning the knife and carrying away any plant residues obstructing the function of the knife.

5 Claims, 4 Drawing Figures

MACHINE FOR REMOVING FOLIAGE FROM ROOT CROPS

For the removal of foliage from root crops, especially sugar beets, several different types of equipment are presently available, among them machines by which the removed foliage is spread out, but also such machines as permit the foliage to be collected.

A common machine type permitting collecting of the foliage is equipped with a wheel rotating about a transversely directed horizontal axis and adapted to hold the top portion or crown of the crop in correct position when a knife mounted underneath the wheel cuts off the crown. Foliage removed by this machine type becomes intermingled with earth and other impurities and therefore cannot be used for direct feeding or ensiling purpose or for the production of protein.

Other machine types use a rotary stripper capable of rotating about an axis disposed either longitudinally or transversely of the machine. The stripper rotates in a substantially enclosed casing terminating in the vicinity of the ground. The casing serves to generate a powerful indraft from the stripping area so that removed foliage is sucked up into the casing. As a result of this powerful suction action, earth will be carried along and mixed with the foliage. The foliage removed by such a machine is torn to shreds and mixed with earth to such an extent that it is unsuitable for subsequent processing and use. Both machine types besides have highly complicated transmissions for the movable parts.

The present invention has for its object to provide a machine which is operable to remove foliage from root crops and which does not suffer from the above-mentioned disadvantages.

To this end, the present invention provides a machine for removing foliage from root crops, said machine comprising, a stripping wheel having a plurality of approximately radially extending elongated wings having propeller blade-like pitch and supported for rotation about an axis which extends substantially in the direction of travel of the machines, said stripping wheel being disposed in a casing which as viewed in the direction of travel of the machine is open at the front and closed at the rear by a vertical rear wall, said casing having generally arcuate side walls provided with a lower opening through which the wings of the stripping wheel extend to contact the foliage of the root crops, said side walls having a laterally offset upper discharge opening for the foliage severed from the root crops, an upwardly extending discharge pipe connected to said discharge opening and having its center line oriented generally radially with respect to said stripping wheel, and means for rotating said stripping wheel in a direction moving the wings of said wheel upwardly throughout its movement from the lower casing opening 39 to the upper discharge opening of the casing so as to move the shorter way from the lower casing opening to the upper discharge opening.

The invention will now be described more fully hereinbelow with reference to the accompanying drawings and the appended claims.

Figure 1:
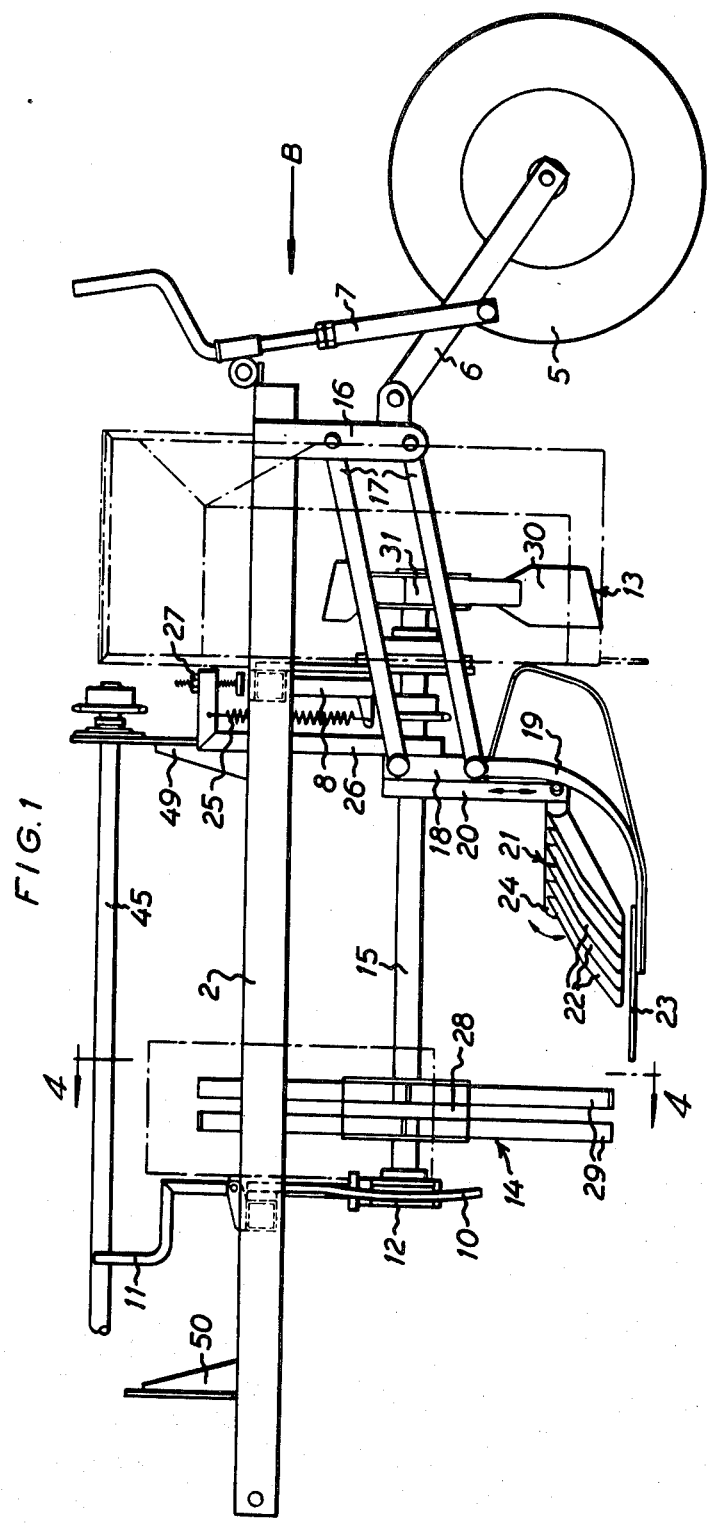
FIG. 1 is a side view of the machine according to the invention.
Figure 2:
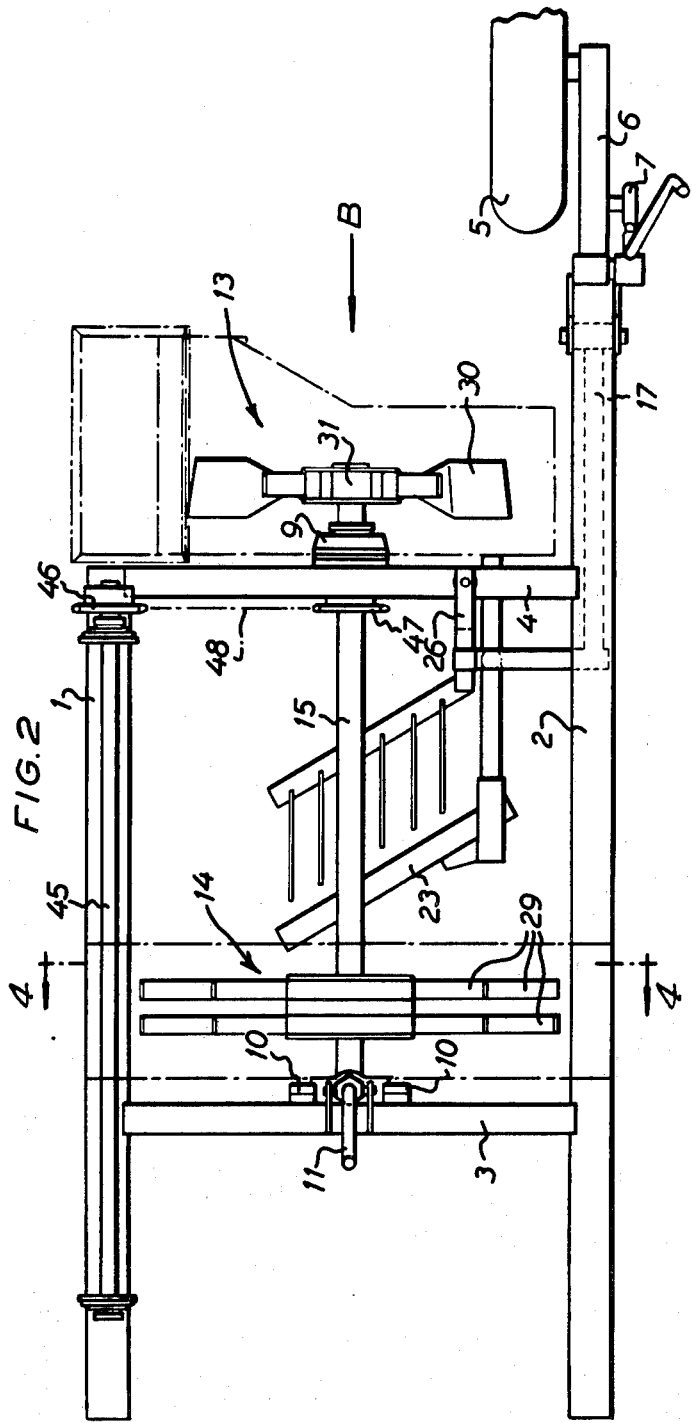
FIG. 2 is a plan view of the machine.
Figure 3:
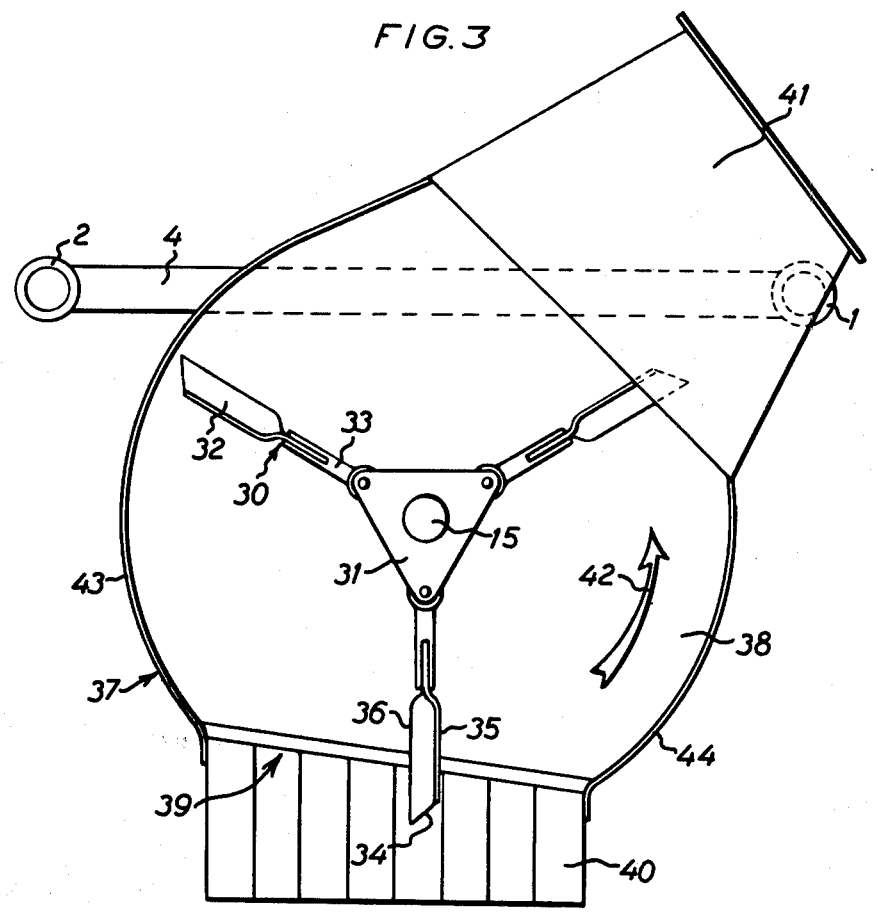
FIG. 3 is a view of part of the machine, as seen in the direction of the arrow B in FIGS. 1 and 2.

As will appear from FIGS. 1 and 2, the machine according to the invention comprises a substantially horizontal frame having two longitudinal members 1 and 2 and two transverse members 3 and 4. The longitudinal member 2 which, as seen in the direction of travel of the machine, is the right-hand one, is longer than the left-hand longitudinal member 1 and extends forwardly in the longitudinal direction of the machine beyond the transverse member 4. A wheel 5 is mounted vertically movable by a link 6 which is pivotal in a vertical plane about its rearward end by means of a control mechanism 7. The rearward ends of the two longitudinal members are provided with coupling means by which they can be coupled for instance to a trailing machine in such a manner that the frame will be vertically pivotal about a transverse axis of pivotment extending through both coupling means. The vertical position of the frame is determined by the coupling means which are stationary in the vertical direction and by setting of the control mechanism 7.

A forward bearing assembly 9 is mounted in a vertically directed bracket 8 centrally fixed to the underside of the forward transverse member 4. The bearing assembly comprises a roller bearing having a spherical outer ring and enables the stripper shaft to pivot about a horizontal transverse axis of pivotment. Two vertically directed guides 10 extend downwardly from the center portion of the rearward transverse member 3, the lower parts of said guides being arcuate and having their centers in the transverse axis of pivotment of the forward bearing assembly 9. A rearward bearing assembly 12 is slidably mounted between the lower arcuate parts of the guides 10 and vertically adjustably by a setting mechanism 11. The two bearing assemblies 9 and 12 carry a shaft 15 rotatably mounted in the longitudinal direction of the machine and carrying at its forward end, in front of the bearing assembly 9, a stripping wheel 13, and at its rearward end, in front of the bearing assembly 12, a cleaning and conveying wheel 14. To set the working position of the stripping wheel 13, the front part of the machine frame is adjusted to the desired height by means of the control mechanism 7. In order that the cleaning and conveying wheel 14 also operate at the correct height above the ground, the rearward bearing assembly 12 is set to the correct height by means of the setting mechanism 11. The shaft 15 will then pivot in the bearing assembly 9. This swinging movement of the shaft 15 affects, it is true, the vertical setting of the stripping wheel 13 but, since the distance from the stripping wheel center to the axis of pivotment of the bearing assembly 9 is but about 1/10 of the distance between the point of suspension of the bearing assembly 9 and the center of the cleaning wheel, the vertical setting of the stripping wheel will remain largely unaffected.

Attached to the forward end of the right-hand longitudinal member 2 of the frame is a downwardly directed vertical attachment member 16 which at its lower end carries an attachment for the link 6 of the wheel 5. The vertical attachment member 16 also carries articulated attachments for two quadrangle links 17 located in parallel above one another. The rearward ends of these links are pivotally connected to a mounting 18 which, via a transversely directed horizontal part, is connected to a knife attachment 19 and a vertically adjustable attachment 20 for a vertical guide member 21. The knife attachment 19 is approximately arcuate in a rearward and downward direction and carries at its lower end a horizontal, vertically flexible knife 23 by which the scalp of the crop is cut off. The knife 23 which is made from a narrow and relatively thin steel strip, is sharpened along its front edge and extends obliquely rearwardly from the knife attachment 19. The vertical guide member 21 comprises a body portion 24 disposed in parallel with the knife 23 and secured to the lower end of the attachment 20. Extending from the body portion 24 are a number of narrow parallel tongues 22 which are directed obliquely downwardly and of such a length that they terminate within the area immediately in front of and slightly above the knife 23. The inclination of the tongues 22 with respect to the horizontal plane can be adjusted, simultaneously as the rearward ends of said tongues are adjustable to correct position above and in front of the knife 23 by rotating the body portion 24 about its longitudinal axis which is displaceable in the longitudinal direction of the machine, whereupon the body portion is locked in correct position. Setting can also be accomplished by means of the attachment 20. During operation of the machine, the vertical guide member 21 slides upon and is lifted by the crown residues so that the knife 23 will take only the scalp of the crop. It is important that the knife has a certain flexibility in the vertical direction so that it can continue, during flexing, its scalping operation also if the vertical guide member 21 should be lifted by the next beet in the row before the cut has been completed. The vertical guide member 21 and the knife 23 are biased together in a downward direction by means of a spring 25 of adjustable tension which is disposed between an attachment in the downwardly directed bracket 8 and a member 26 extending upwardly from the mounting member 18 and carrying at its upper end a setting screw 27 for setting the lowermost position of the knife 23 and the vertical guide member 21. The setting screw 27 is set in such a manner that its head engages the transverse member 4 when the knife 23 is located at its lowermost effective cutting height.

Figure 4:
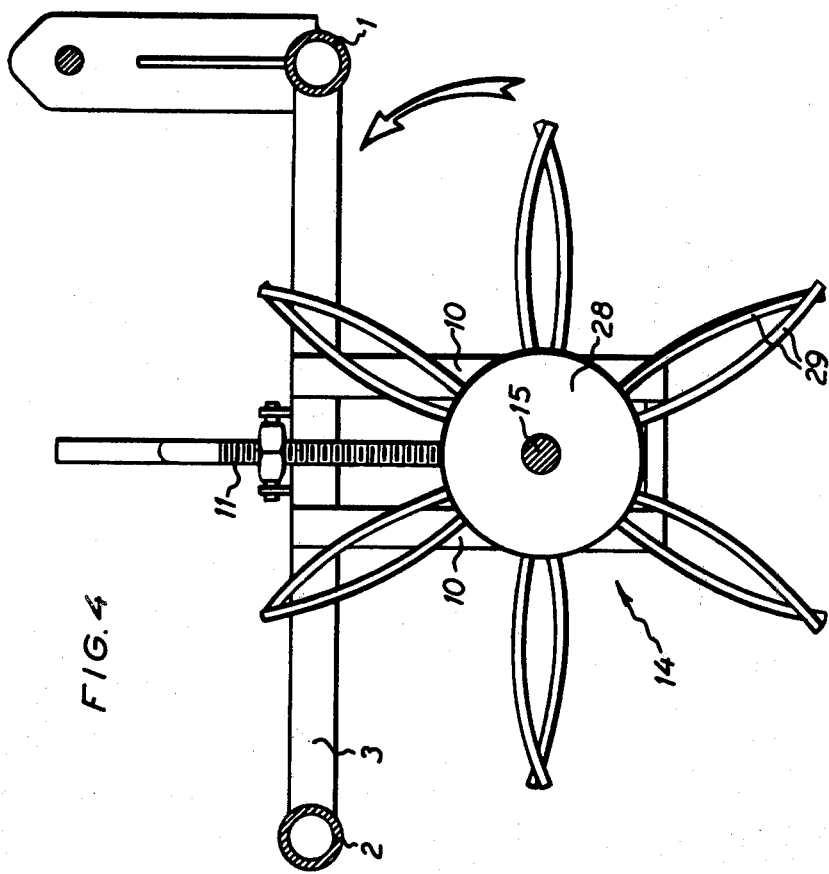
FIG. 4 is a sectional view taken along the line 4—4 in FIGS. 1 and 2.

The cleaning and conveying wheel 14 is disposed behind the knife 23 at such a distance, i.e. immediately behind said knife, that the severed scalps are thrown out by the flails 29 of the cleaning wheel before they can drop to the ground. The cleaning and conveying wheel 14 comprises a hub portion 28 non-rotatably secured to the shaft 15. A number of flails 29 which preferably are made of rubber, extend substantially radially from the hub portion 18. The flails operate underneath a protective cover which in FIGS. 1, 2 and 4 is shown by dash-and-dot lines and are disposed in two rows along the periphery of the hub portion 28 with an axial spacing between the rows.

The stripping wheel 13 which is mounted on the forward end of the shaft 15 immediately in front of the bearing assembly 9, has a hub portion 31 which is non-rotatably secured to the shaft 15. In the embodiment illustrated, the hub portion 31 is in the form of an equilateral triangle, and at each corner of this triangle a wing 30 is pivotally mounted. During rotation, the wings 30 are directed radially outwardly under the action of centrifugal force, but if the wings should strike against a stationary object, their articulate attachment allows them to be swung aside without being damaged. At their radially outermost portion 32, the wings have an axial extent which is about twice as great as at their radially innermost portion 33 to facilitate mounting in the relatively short hub portion. The forward edge 35 of the radially outermost portion 32 is twisted forwards in the direction of rotation, while its rear edge 36 is twisted backwards in the direction of rotation. In this manner, the radially outermost portion 32 of the wing 30 will obtain the pitch of a propeller blade. The peripheral edges 34 of the wings 30 are inclined in such a manner that the stripping wheel 13 will have its smallest outer diameter at its forward edge. Due to this inclination of the peripheral edge, a beet sticking far out of the ground will not be struck down when when hit by the wings 30. Instead, the wings 30, owing to their twisted peripheral edges 34, will gradually cut off the projecting part of the beet.

The stripping wheel 13 operates within a casing 37 which, by means of a wall 38, is closed on its rearward side but open on its forward side. The casing 37 is essentially in the form of a short cylinder having a horizontal center axis directed longitudinally of the machine, the wall 38 constituting the cylinder bottom. The approximately lowermost fourth part of the cylinder wall is cut away, and the casing 37 thus has a downwardly directed opening 39. Within the area of the opening 39, the wall 38 has a flexible, downwardly directed extension 40 which preferably is made of rubber and has such a length that it terminates immediately above the ground when the stripping wheel 13 has been set to correct operating height. A discharge pipe 41 is connected to the upper left-hand part of the casing, as seen in the direction of travel of the machine. The right-hand peripheral wall 43 of the casing, which extends from the discharge pipe 41 to the opening 39, as seen in the direction of rotation of the stripping wheel 13 (arrow 42), has an axial extent which is approximately $2\frac{1}{2}$ to 3 times as great as the radially outer portion 32 of the stripping wheel wings 30. The left-hand peripheral wall 44 of the casing, which extends from the opening 39 in the direction of the arrow 42 to the beginning of the discharge pipe 41, has an axial extent which is approximately $3\frac{1}{2}$ to 4 times greater than the axial extent of the radially outer portion 32 of the stripping wheel wings 30. The discharge pipe 41 which has a rectangular discharge opening, has an inlet in the form of a rectangle, one corner of which has been cut away. The sides of the rectangle are constituted by the wall 38, the left-hand peripheral wall 44 of the casing, a portion of the forward side of the discharge pipe 41, said forward side being parallel to the wall 38, another portion of the forward side of the discharge pipe, and the right-hand peripheral wall 33 of the casing. During operation, the stripping wheel 13 rotates in the direction of the arrow 42, i.e. each wing is moved the shortest way from the foliage removal area to the discharge pipe 41. During rotation, an excess pressure is built up between the stripping wheel 13 and the wall 38, due to the propeller blade-like pitch of the wings 30. In addition, the wings 30 will simultaneously act as the vanes of a radial fan, for which reason a powerful air stream from the foliage removal area conveys the foliage toward the discharge pipe 41. This air stream carries the severed crowns the shortest way from the removal area to the discharge pipe 41, without damaging the foliage or mixing it with sucked-up earth. The extension 40 of the wall 38 serves to increase the excess pressure between the stripping wheel 13 and the wall 38, whereby the air stream will be further increased. Due to the special design of the wings 30 and the casing 37, the conveyed air stream is sucked in substantially from in front and leaves the casing via the discharge pipe 41. The foliage carried by the air stream is entirely free from impurities and has neither been shredded nor crushed when leaving the discharge pipe 41. In other words, the foliage is always in a condition well suited for collecting and subsequent processing.

The common shaft 15 of the stripping wheel 13 and the cleaning and conveying wheel 14 is operated via a chain or belt transmission 48 from a transmission shaft 45 disposed slightly above and parallel to the left-hand longitudinal member 1 of the machine frame. The transmission shaft 45 carries at its forward end a chain drive 46 or a belt pulley, and the shaft 15 also carries a corresponding drive 47 immediately behind its bearing assembly 9. The transmission shaft 45 is rotatably mounted, by suitable bearings, in a forward attachment arm 49 which is directed upwardly and secured to the left-hand longitudinal member 1 of the machine frame, and is secured to a rearward attachment arm 50 which likewise is directed upwardly and secured to the left-hand longitudinal member 1 of the machine frame. The transmission shaft 45 is driven, via a suitably designed coupling member disposed at its rearward end, from the power take-off shaft of the trailing machine to which the two longitudinal members 1 and 2 are secured.

In the drawings, the setting mechanism 11 and the control mechanism 7 have been shown as threaded spindles cooperating with a stationary nut and carrying at one end a crank. These manually operable mechanisms may be replaced, in a modified embodiment of the machine, by hydraulic setting means, whereby the machine will be operable from the driver's seat on the traction vehicle to which it is coupled.

What I claim and desire to secure by Letters Patent is:

1. A machine for removing foliage from root crops, said machine comprising, a stripping wheel having a plurality of approximately radially extending elongated wings having propeller blade-like pitch and supported for rotation about an axis which extends substantially in the direction of travel of the machines, said stripping wheel being disposed in a casing which as viewed in the direction of travel of the machine is open at the front and closed at the rear by a vertical rear wall, said casing having generally arcuate side walls provided with a lower opening through which the wings of the stripping wheel extend to contact the foliage of the root crops, said side walls having a laterally offset upper discharge opening for the foliage severed from the root crops, an upwardly extending discharge pipe connected to said discharge opening and having its center line oriented generally radially with respect to said stripping wheel, and means for rotating said stripping wheel in a direction moving the wings of said wheel upwardly throughout its movement from the lower casing opening (39) to the upper discharge opening of the casing so as to mvoe the shorter way from the lower casing opening to the upper discharge opening.

2. A machine according to claim 1 wherein said discharge opening takes up approximately one-fourth of the circumference of said casing.

3. A machine according to claim 1 wherein the wings of said stripping wheel are made of a rigid material, and the peripheral edges of said wings are inclined to provide the stripping wheel with a greater diameter at its rearward edge than at its forward edge.

4. A machine according to claim 1 wherein the lower opening of said casing comprises approximately the lowermost one-fourth of the circumference of said casing, said opening having a leading edge and a trailing edge as seen in the direction of rotation of said stripping wheel, said leading edge being spaced a greater distance from the ground than said trailing edge, said rear wall having a downwardly directed flexible extension in the area of said lower opening of said casing.

5. A machine according to claim 4 wherein the wings of said stripping wheel are made of a rigid material, and the peripheral edges of said wings are inclined to provide the stripping wheel with a greater diameter at its rearward edge than at its forward edge.

* * * * *